No. 667,551. Patented Feb. 5, 1901.
W. H. MORENUS.
GRADING AND DITCHING MACHINE.
(Application filed Nov. 5, 1900.)
(No Model.) 2 Sheets—Sheet 1.
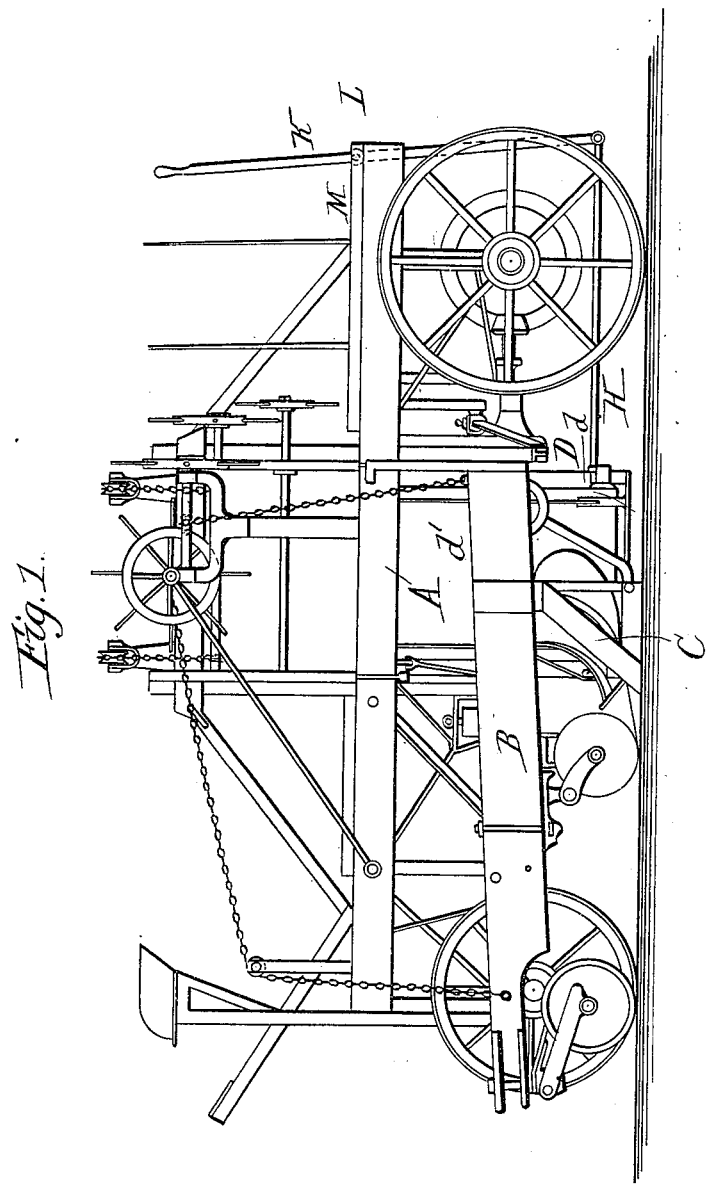
Witnesses:
A. F. Durand
A. G. Olsen
Inventor:
William H. Morenus.
by Chas. L. Page Atty.

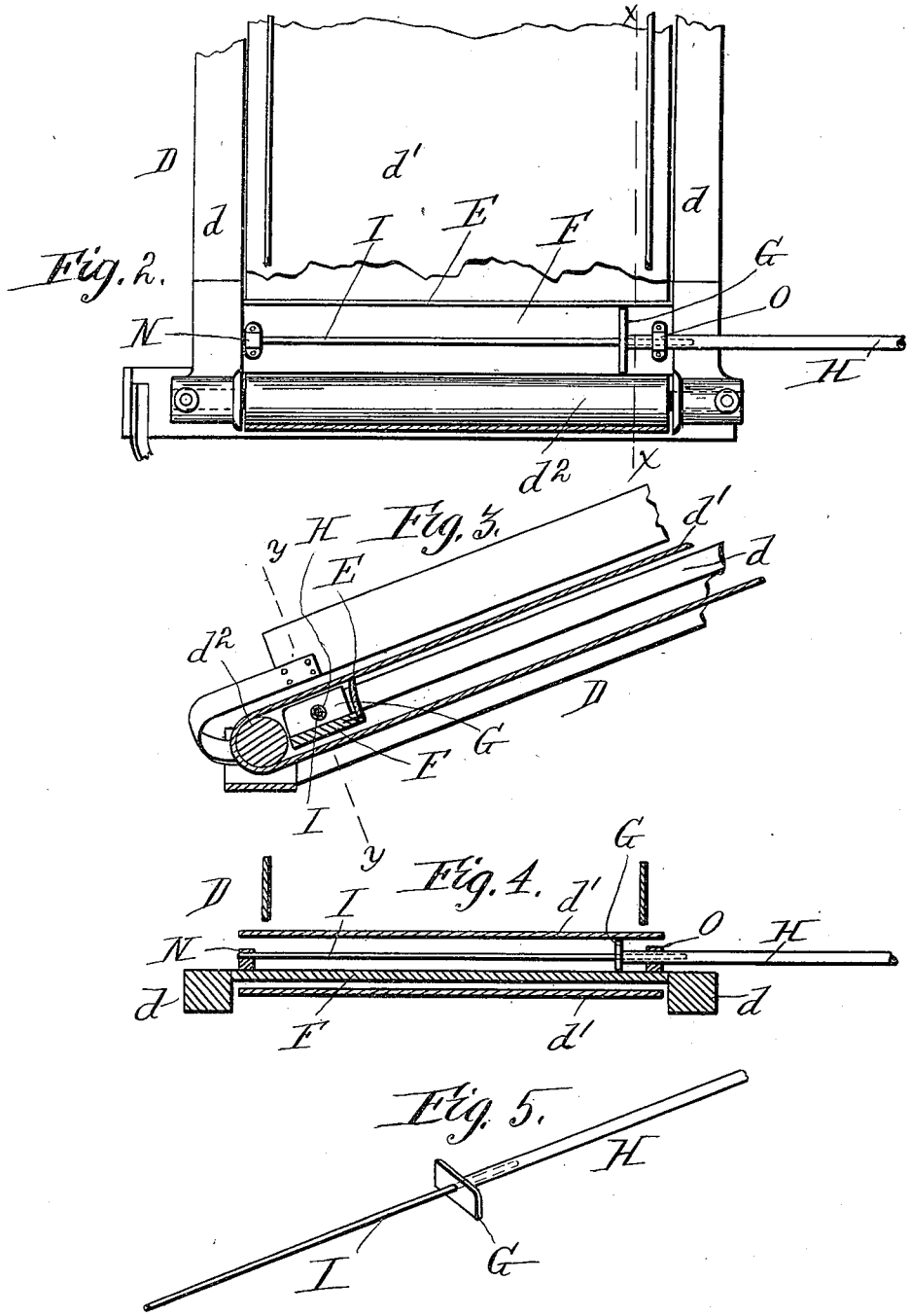

UNITED STATES PATENT OFFICE.

WILLIAM H. MORENUS, OF LAKE VIEW, IOWA, ASSIGNOR TO FREDERICK C. AUSTIN, OF CHICAGO, ILLINOIS.

GRADING AND DITCHING MACHINE.

SPECIFICATION forming part of Letters Patent No. 667,551, dated February 5, 1901

Application filed November 5, 1900. Serial No. 35,523. (No model.)

*To all whom it may concern:*

Be it known that I, WILLIAM H. MORENUS, a citizen of the United States, residing at Lake View, in the county of Sac, State of Iowa, have invented a certain new and useful Improvement in Grading and Ditching Machines, of which the following is a specification.

My invention relates to a construction of grading and ditching machine comprising a suitably-arranged plow, an elevating-conveyer having an endless conveyer-belt which takes the soil from the plow and carries the same to a desired point of discharge, and a scraper arranged to scrape off soil adhering to the inner side of the conveyer-belt and discharge the same onto a shelf or guard arranged between the two leaves of such conveyer-belt.

Objects of my invention are to free the shelf or guard from such soil as may collect thereon, to provide a simple, compact, and efficient ejector for such purpose, to permit the ejector to be operated by an attendant on the machine, so as to avoid stopping the latter, and to provide certain novel and improved details, as hereinafter set forth.

In the accompanying drawings, Figure 1 shows in side elevation a grading and ditching machine embodying my invention. Fig. 2 is a top plan view, on a larger scale, of the lower end portion of the elevating-conveyer, a portion of the conveyer-belt being broken away for convenience of illustration. Fig. 3 is a section through Fig 2 on line $x\,x$. Fig. 4 is a section through the elevating-conveyer on line $y\,y$ in Fig. 3. Fig. 5 shows in perspective the ejector, a guide-rod therefor, and a portion of the tubular ejector-rod.

A indicates the body-frame of the machine, and B denotes the plow-beam, arranged at one side of the machine and provided with a suitable plow C. The transversely-positioned elevating-conveyer D comprises a suitable frame $d$ and an endless conveyer-belt $d'$, arranged to pass about a roll $d^2$ at the lower end of the frame of the elevating-conveyer. The lower end of this elevating-conveyer is positioned to receive loose soil from the plow, the soil thus received being carried up by the conveyer-belt to the point of discharge. In order to free the inner side of the conveyer-belt from such soil as will collect thereon during operation, a flexible scraper E is arranged between the leaves of the conveyer-belt at a point comparatively near the lower belt-roll $d^2$ and supported to impinge against the inner side of the upper leaf of the conveyer-belt, and thereby scrape therefrom any adhering soil. In order to prevent the soil thus scraped from the upper leaf of the conveyer-belt from falling upon the inner side of the lower leaf of such belt, the scraper is arranged to discharge the soil onto a transversely-arranged shelf or guard-plate or board F, which intervenes between the lower belt-roll $d^2$ and the scraper E. This transversely-arranged shelf or guard F is secured at its ends to the side bars of the elevating-conveyer, and to some extent forms, in conjunction with the scraper E, a dirt-collecting trough, its purpose, however, being to serve as a guard, which prevents soil scraped from the inner side of the upper belt-leaf from falling upon the lower belt-leaf and clogging the operative parts of the elevating-conveyer. In order to free this shelf or guard from soil collected thereon at any desired time and without stopping the machine, I provide a reciprocating ejector G, arranged to traverse the shelf or guard F, substantially from end to end thereof. With such arrangement the ejector can be normally maintained at the limit of its back stroke, and by means of suitable operating mechanism under control of an attendant on the machine it can at any desired time be caused to traverse the shelf or guard and push ahead the soil thereon to an extent to cause such soil to discharge through the space between the belt-leaves at one side of the elevating-conveyer.

As a simple and compact construction of mechanism or device for operating the ejector the latter is arranged upon one end of a reciprocating tubular rod H, fitted to work upon a guide-rod I, which is secured at one end to the frame of the elevating-carrier and arranged over the shelf or guard F. The tubular rod H extends horizontally to the rear portion of the machine and at its rear end is connected by suitable hinge connection with the lower end of an upright operating-lever K. This operating-lever is fulcrumed on the body-frame of the machine, as at L, and has its upper arm portion within convenient reach of an attendant on the rear platform M of the machine.

In the drawings the ejector is shown in its back or normal position. By properly operating the lever K the tubular rod H, which connects with the ejector, can be caused to have a forward endwise movement, and thereby cause the ejector to traverse the shelf or guard, the guide-rod I during such action being received within the tubular ejector-rod to an extent proportional to the extent of movement on the part of the latter. The movement of the ejector, which is transverse to the line of the endless belt, will also serve to free the guide-rod from adhering soil, and while other forms or arrangements of guides for the ejector could be provided I prefer the arrangement shown on account of its simplicity, efficiency as a means for permitting the ejector to be worked accurately and with comparative ease, and non-interference with discharge of soil from the scraper E onto the shelf or guard.

While the guide-rod I is only secured at one end, its free end, which enters the tubular ejector-rod, will be suitably steadied by the latter, which works through a suitable bearing on one side of the frame of the elevating-conveyer—as, for example, one end of the rod can be held by a bearing N, while the tubular ejector-rod can work through a bearing O on the shelf or guard or frame of the elevating-conveyer, as may be desired.

What I claim as my invention is—

1. A grading and ditching machine comprising an elevating-conveyer which receives the soil from a plow; a scraper for freeing the inner side of the upper leaf of the conveyer-belt from adhering soil; a shelf or guard arranged between the belt-leaves in position to receive the soil from the scraper; and a reciprocating ejector arranged to move transversely to the line of conveyer-belt and to traverse the shelf or guard in order to free the same from soil collected thereon.

2. A grading and ditching machine comprising an elevating-conveyer which receives the soil from a plow; a scraper for freeing the inner side of the upper leaf of the conveyer-belt from adhering soil; a shelf or guard arranged between the belt-leaves in position to receive the soil from the scraper; a reciprocating ejector arranged to move transversely to the line of conveyer-belt and to traverse the shelf or guard in order to free the same from soil collected thereon; and an operating device applied for actuating the ejector and arranged to be under control of an attendant upon the machine.

3. In a grading and ditching machine of the class described, an ejector arranged to traverse a soil-collecting guard which is positioned between the leaves of the conveyer-belt to receive soil scraped from the inner side of the upper leaf of such belt; a transversely-arranged guide-rod secured at one end portion; a reciprocating tubular ejector-rod applied for operating the ejector and receiving the free end portion of the guide-rod; and suitable means for operating the ejector-rod.

WILLIAM H. MORENUS.

Witnesses:
CHAS. G. PAGE,
ARTHUR G. OLSEN.